United States Patent
Mansuy

(10) Patent No.: US 7,270,179 B2
(45) Date of Patent: Sep. 18, 2007

(54) METHOD FOR STIMULATION OF LIQUID FLOW IN A WELL

(75) Inventor: Neil Mansuy, Kansas City, MO (US)

(73) Assignee: Subsurface Technologies, Inc., Rock Tavern, NY (US)

( * ) Notice: Subject to any disclaimer, the term of this patent is extended or adjusted under 35 U.S.C. 154(b) by 253 days.

(21) Appl. No.: 10/512,672

(22) PCT Filed: Dec. 3, 2001

(86) PCT No.: PCT/US01/47009

§ 371 (c)(1),
(2), (4) Date: Apr. 28, 2005

(87) PCT Pub. No.: WO02/055831

PCT Pub. Date: Jul. 18, 2002

(65) Prior Publication Data

US 2005/0217851 A1    Oct. 6, 2005

Related U.S. Application Data

(60) Provisional application No. 60/254,149, filed on Dec. 8, 2000.

(51) Int. Cl.
| | |
|---|---|
| E21B 36/00 | (2006.01) |
| E21B 37/08 | (2006.01) |
| E21B 43/25 | (2006.01) |
| E21B 43/27 | (2006.01) |
| E21B 47/08 | (2006.01) |
| E21B 49/00 | (2006.01) |

(52) U.S. Cl. ............. 166/250.07; 166/66; 166/250.01; 166/250.17; 166/263; 166/302; 166/307; 166/311; 166/312; 166/387; 210/741; 210/742

(58) Field of Classification Search ............... 166/66, 166/250.01, 250.07, 263, 302, 305.1, 307, 166/311, 312, 387; 210/741, 742, 747
See application file for complete search history.

(56) References Cited

U.S. PATENT DOCUMENTS

| | | | | | |
|---|---|---|---|---|---|
| 1,843,002 | A | * | 1/1932 | Small ......................... | 166/192 |
| 2,661,066 | A | * | 12/1953 | Bond ......................... | 166/283 |
| 3,076,762 | A | * | 2/1963 | Dill ............................ | 166/307 |
| 5,168,930 | A | * | 12/1992 | Wiseman et al. ........... | 166/307 |
| 5,394,942 | A | * | 3/1995 | Catania et al. .............. | 166/302 |
| 6,142,232 | A | * | 11/2000 | Troutt et al. ................ | 166/312 |
| 6,338,386 | B1 | * | 1/2002 | Catania et al. ......... | 166/250.07 |
| 6,817,427 | B2 | * | 11/2004 | Matsuo et al. ................ | 175/67 |
| 6,988,552 | B2 | * | 1/2006 | Wilson et al. .............. | 166/302 |

* cited by examiner

*Primary Examiner*—George Suchfield
(74) *Attorney, Agent, or Firm*—Eugene C. Rzucidlo; Hunton & Williams LLP

(57) ABSTRACT

An improved method of controlled energy delivery utilizing solid, liquid, and gaseous carbon dioxide ($CO_2$) into a water well and the surrounding aquifer to remove deposited material which may cause loss of capacity in wells and a variety of water quality problems. After proper study and evaluation of problems associated with a well to be treated, adequate injection of the required amount of $CO_2$ and energy is achieved by real-time monitoring during the injection and manipulating the phase changes in the $CO_2$ that take place in the well and the aquifer.

11 Claims, 1 Drawing Sheet

METHOD FOR STIMULATION OF LIQUID FLOW IN A WELL

CROSS-REFERENCE TO RELATED APPLICATIONS

This application claims priority from Mansuy, "Aqua Freed Process," U.S. Provisional Application No. 60/254,149, filed Dec. 8, 2000, herein incorporated by reference.

BACKGROUND OF THE INVENTION

1. Field of the Invention

This invention relates to water wells, and more particularly to an improved method of removing deposited material from a well and the surrounding aquifer. This method generally comprises initially properly evaluating problems associated with a particular well and then utilizing the controlled and telemetry-monitored injection into the well of energy derived from phase changes in solid, gaseous, and liquid carbon dioxide ($CO_2$) to remove such deposited material.

2. Description of the Prior Art

The prior art reveals techniques for stimulating the flow of water in a dry well or one providing insufficient water. For example, in U.S. Pat. No. 5,394,942 issued to Catania, et al., the disclosures of which are herein incorporated by reference, pressure in a dry or inefficient well is regulated to a desired level through use of a sealing cap, and nontoxic gaseous and liquid carbon dioxide ($CO_2$) is introduced into the well. The pressure and flow of gaseous and or liquid are regulated to such a level, between about 0 and 70 psi pressure, that the liquid $CO_2$, upon entering the sealed well, rapidly solidifies within the well. This liquid $CO_2$ can be added until the well is filled with solid $CO_2$; the solid sealed $CO_2$-filled well is then allowed to sit, and the solid $CO_2$ gradually sublimes. Because of the temperature differential between the well formation and the solid $CO_2$, the solid $CO_2$ sublimates releasing gaseous $CO_2$ into the formation; consequently carbonic acid ($H_2CO_3$) is produced upon contact of the $CO_2$ with water in the formation. The presence of the $H_2CO_3$ in the well aids in the removal of bacteria from surfaces in the formation, especially iron-related bacteria, such that a bactericidal effect can be achieved. After the solid $CO_2$ sublimation is completed, any residual pressure in the well is released, and the well is unsealed. Additionally, because of the freezing within the well and well formation, encrustation in the well from such material as drilling mud, natural clay and silt, and other physical blocking agents and/or mineral scaling in the well formation and in the well screens is removed. If desired, the process may be repeated until the flow of water into the well is sufficient.

However, every well that is to be treated with such a process is slightly different than any other well to be treated. Prior to treating a dry or inefficient well, it is therefore desirable to evaluate the aquifer and the type of problem in the well. This evaluation shall aid the determination of the most effective method of delivering the requisite energies of agitation, dissolution, and detachment delivered during the phase changes of $CO_2$ to allow the effective cleaning of deposits from the surfaces of a well and the surrounding aquifer. For example, the amount of injection of energy during the process disclosed in U.S. Pat. No. 5,394,942 can vary depending upon well design, well problems, well construction, and site considerations.

Additionally, the liquid $CO_2$ is most often introduced into a well in short pulses of liquid while still feeding gaseous $CO_2$. These short pulses are for the purpose of determining how a water well will respond to the injection of the additional energy. It is very important to observe the various pressures during the stages of liquid $CO_2$ injection, because the pressures of injection can range from 0 to 300 psi depending on the individual type of well. It is therefore desirable to provide a method of injection of $CO_2$ into a well to clean out deposited material wherein real-time monitoring of the pressures and temperature inside the well takes place. This monitoring would provide the information necessary to determine the required injection rates of gaseous and liquid $CO_2$ in order to manipulate the phases of $CO_2$ and phase changes in the well, and therefore allow better control of the energy delivery into the well.

Finally, due to the physical properties of $CO_2$ and the conditions inside a well when $CO_2$ is injected, not all the desired phase changes can be achieved with just the injection of gaseous and liquid $CO_2$. In deep wells or wells that have a hydrostatic pressure greater than 75 psi, desired phase changes are not always achieved. Inside a well and under hydrostatic pressures greater than 75 psi, a well is very similar to a pressure vessel, with a phase change taking place from pressure dissipating into the surrounding aquifer and with temperature changes as calories are transferred to and from the water and surrounding formation. When the pressure in the well is greater than 75 psi and the hydrostatic pressure is greater than 75 psi, liquid $CO_2$ would penetrate into the surrounding formation and then convert to a gas without going to a solid. This would be a more rapid phase change than is sometimes desired. Consequently, it is desirable to have a method of temperature and pressure manipulation which will allow for more efficient and useful phase changes in the $CO_2$ in the well.

OBJECTS OF THE INVENTION

It is therefore a general object of the present invention to provide a method of controlled energy delivery utilizing gaseous and liquid $CO_2$ into a water well and the surrounding aquifer to remove deposited material which may cause loss of capacity in wells and a variety of water quality problems.

It is an object of the present invention to provide a method of controlled energy delivery utilizing gaseous and liquid $CO_2$ into a water well and the surrounding aquifer to remove deposited material wherein the well is initially examined in such an adequate and detailed manner that it is then possible to predetermine the precise and accurate amount of energy needed to effectively remove deposited material that is plugging the pore volume of the well and aquifer.

It is a further object of the present invention to provide a method of controlled energy delivery utilizing gaseous and liquid $CO_2$ into a water well and the surrounding aquifer to remove deposited material wherein the well is monitored during the injection of $CO_2$ in order to obtain information about pressures and temperature inside the well, thereby allowing better control of the energy delivery into the well.

It is a still further object of the present invention to provide for manipulation of the phase changes of the injected gaseous and liquid $CO_2$ through control of the various pressure dependent changes that may take place in the subsurface environment.

SUMMARY OF THE INVENTION

The problems of the prior art have been solved by the present invention, which relates to an improved method of removing deposited material from a dry or inefficient well and the surrounding aquifer through initial proper evaluation of problems associated with a particular well and through controlled and telemetry-monitored injection of energy derived from phase changes in solid, gaseous, and liquid $CO_2$ into the capped and sealed well to remove such deposited material.

Before any type of work is to be done on a dry or inefficient well, the practitioner is to gather information about the history and characteristics of the well, through examining the chemistry of the water contained therein, geophysical logs or drillers logs, groundwater microbiology, downhole video images, and any other information that may exist.

Monitoring various physical and chemical reactions inside the well during injection of gaseous and liquid $CO_2$, such as disclosed in U.S. Pat. No. 5,394,942, allows better manipulation of and control over the materials during such a process. For example, the use of telemetry to monitor pressure and temperature during the entire process on a well allows data collection for quality control and potential improvements. It is also possible to incorporate direct and continuous monitoring of such parameters as pH, total dissolved solids, conductivity, $CO_2$, etc. This would allow the refinement of the process to make it more effective as well as more efficient, such as indicating the efficient use of less $CO_2$, and concomitant lowering of injected $CO_2$ levels, during the process.

The most important aspect of injecting $CO_2$ into a water well is to inject enough liquid or gaseous $CO_2$ into the well and the surrounding formation without excessive freezing of the water in the well through the phase changes of vaporization (liquid to gas), freezing (liquid to solid), and sublimation (solid to gas). It is the energy delivered during these phase changes that allows the surfaces of a well and the surrounding aquifer to be effectively cleaned of deposits. To prevent freezing, the first part of the process is the injection of gaseous $CO_2$ for a long enough period of time to evacuate water from both the well and from a certain distance into the formation. This could be described as a bubble into which liquid $CO_2$ is then injected. After some of the water is evacuated, liquid $CO_2$ is then introduced into the sealed well, most often in short pulses, while still feeding gaseous $CO_2$. The pulses are short for the purpose of determining how a well will respond to the injection of the additional energy. It is very important to observe the various pressures during the stages of liquid $CO_2$ injection. Additionally, in the event that the hydrostatic pressure or the pressure inside the well during injection is greater than 75 psi, intermittent pulses of a negative pressure vacuum can stimulate the formation of solid $CO_2$. Finally, it is important to prevent the phase change from liquid $CO_2$ to solid $CO_2$ inside the injection lines, as this can cause spiking of the pressure gauges and also create a potentially dangerous situation with trapping of liquid $CO_2$. This is prevented by maintaining a pressure of greater than 75 psi in the injection lines.

DETAILED DESCRIPTION OF THE INVENTION

Figure 1:
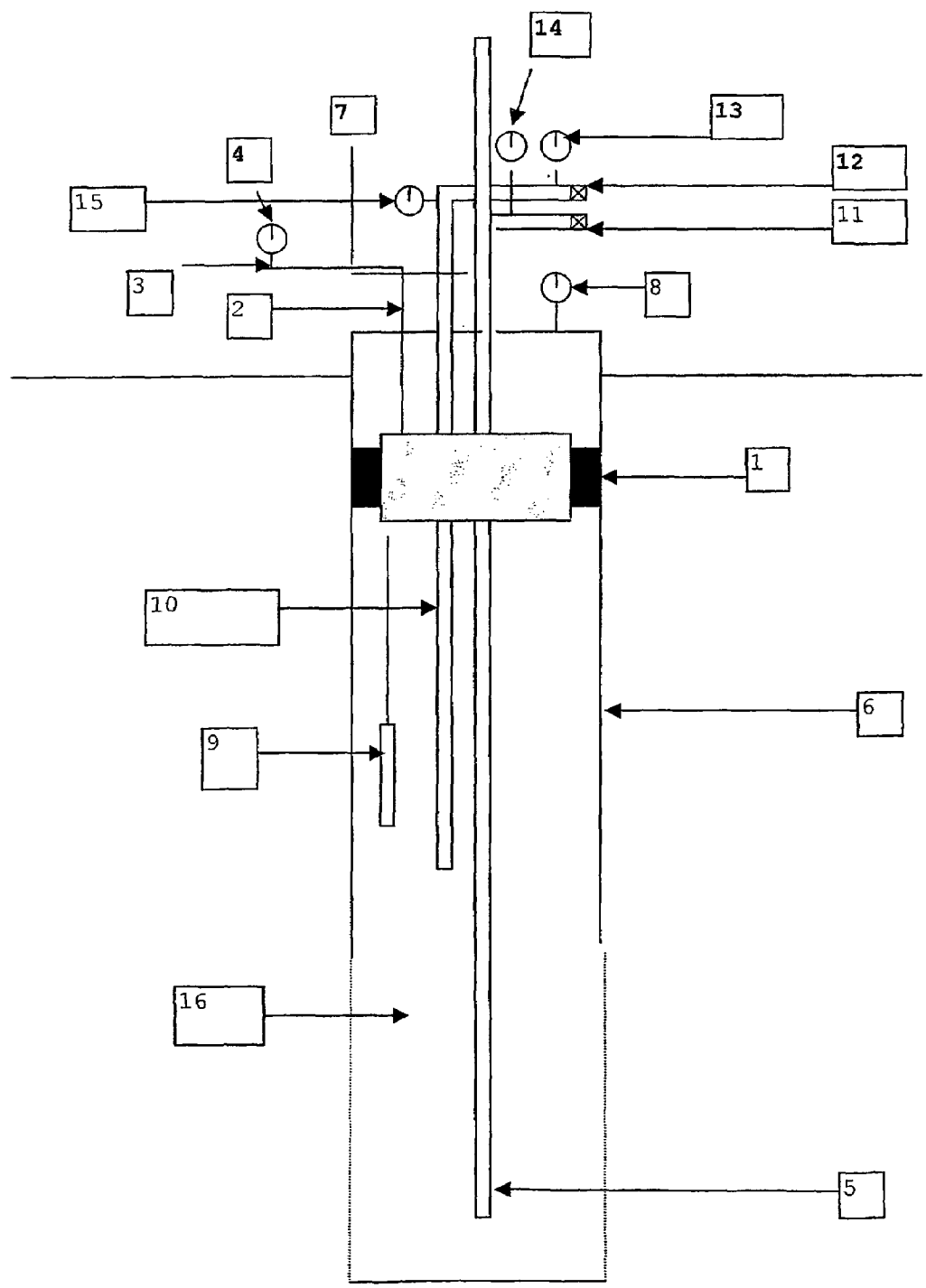
FIG. 1 is a diagrammatic view of the apparatus utilized in the present method.

Prior to any work to be performed to increase the output of a dry or inefficient well, it is necessary to evaluate the aquifer and the type of problem in the well. This is so because every well is slightly different from any other well in terms of physical characteristics and properties and the type of problems presented in water flow. Additionally, the amount of injection of energy during the process disclosed in U.S. Pat. No. 5,394,942 can vary depending upon well design, well problems, well construction, and site considerations. Hence, before any type of work is to be done on a dry or inefficient well, the practitioner is to gather information about the history and characteristics of the well. Such evaluative information is contained within geophysical logs or drillers logs, analysis of the chemistry of the water contained within the well, analysis of the groundwater microbiology, downhole video images, and from other information sources that may exist. By proper information-gathering and analysis, this pre-treatment workup shall aid in determining the most effective and appropriate method of increasing the output or efficiency of a well.

For example, it is important to introduce gaseous $CO_2$ for a sufficient period of time at the beginning of the process to allow evacuation of the water in the well and for some distance into the surrounding formation. This allows the liquid $CO_2$, where most of the energy is contained, to be delivered into the surrounding formation with less associated freezing close to the well bore. The pore volume of the aquifer is significantly less close to the well bore than into the surrounding formation. If liquid $CO_2$ is introduced too early in the injection process, then freezing of water close to the well can prevent the energy penetrating into the surrounding aquifer. Greater penetration and more effective removal of plugging deposits may therefore be achieved with flowing various combinations of gaseous and liquid $CO_2$ at the same time. This will allow the gaseous $CO_2$ to be used as a carrier for liquid $CO_2$ such that the additional energy may be dispersed into the surrounding aquifer to effectively remove deposited material that is plugging the pore volume of the well and aquifer.

The most important aspect of injecting $CO_2$ into a water well is to inject enough product into the well and the surrounding formation without excessive freezing of the water in the well. This is achieved by injecting gaseous $CO_2$ as the first part of the process. The injection of gaseous $CO_2$ for a long enough period of time allows evacuation of water from the well and for a certain distance into the formation. This could be described as a bubble into which liquid $CO_2$ could then be injected. After some of the water is evacuated, liquid $CO_2$ can be then introduced into a sealed well. Liquid $CO_2$ is most often introduced into a well in short pulses of liquid while still feeding gaseous $CO_2$. These short pulses are for the purpose of determining how a water well will respond to the injection of the additional energy. It is very important to observe the various pressures during the stages of liquid $CO_2$ injection. The liquid $CO_2$ is where the majority of the energy is contained. From experience on many wells, the pressures of injection can be from 0-300 psi.

Turning to FIG. 1 of the application, then, there is depicted an apparatus placed in a well to be used according to the method of the present invention. The general procedure involves placing all the injection and monitoring equipment, the packer well cap 1, the well casing 6, the downhole telemetry probe 9, and the alternating vacuum and pressure monitoring line 10, into the well screen 5 at the zone that is selected for the injection of energy based upon the evaluative workup done on the well. Once this equipment is in the well, the packer 1 is inflated to seal the well to optimize the injection of pressurized gaseous and liquid $CO_2$, and therefore the energy contained in the $CO_2$. The packer 1 is normally placed inside the well casing 6. The packer 1 can be inflated through an inflation line 3, and the pressure on the packer 1 can be monitored with a pressure gauge 4. After the well is sealed, gaseous $CO_2$ is discharged from the $CO_2$ storage vessel either from the vapor space of the vessel or from the vaporizer (all not illustrated) and placed in the well through a $CO_2$ injection line 11 to assure that all water is displaced from the transport lines as well as the area immediately below the well seal. Liquid $CO_2$ hoses (not illustrated) are also connected to the injection line 11. Gaseous and/or liquid $CO_2$, or nitrogen, can then be injected into the injection zone 16 of the sealed well. The injection of gaseous and/or liquid $CO_2$ has the energy necessary to detach the sediments from the surfaces of the well and allow them to be removed from the well, both during the development of the well and at later times. The injection of gaseous and or liquid $CO_2$ through the injection line 11 can take place over different periods of time, from several seconds to minutes or even hours, depending upon pressures within the well determined by monitoring the casing pressure gauge 8, the vacuum and pressure monitoring gauge 13, or the injection line pressure gauge 14. There can be a plurality of injection lines 11, this plurality not shown in the figure, placed in the well at various depths, as determined by such factors as well depth, well diameter, operation, etc. Finally, the injection of gaseous and liquid $CO_2$ through the injection line 11 can be performed in repeated cycles until the desired amount of $CO_2$ is injected into the well.

By real-time monitoring of the pressure and temperature within the well via the casing pressure gauge 8, the vacuum and pressure monitoring gauge 13, or the injection line pressure gauge 14, and a thermometer 15, or with the aid of a computer 7 connected to a downhole temperature and pressure telemetry transducer 9, the phase of the injected $CO_2$ can be determined. The pressure can then be manipulated by varying the injection of the ratio of gaseous and liquid $CO_2$ through the injection line 11. It can also be manipulated by creating intermittent pulses of vacuum inside the injection zone 16 of the sealed well at the desired point on injection or monitoring by a vacuum pump 2 through the alternating vacuum and pressure monitoring line 10. A rupture diaphragm (not illustrated) is provided and is set at a slightly higher pressure setting to ensure containment of the well seal in the event that the safety valve 12 in the injection line 11 is defective or rendered inoperable.

The beneficial actions inside a well when gaseous and liquid $CO_2$ are injected under pressure include the formation of carbonic acid ($H_2CO_3$). According to Henry's Law, the solubility of a gas is dependent upon pressure and temperature. The solubility of $CO_2$ in water increases as the pressure increases and the temperature decreases; dissolving $CO_2$ into water creates $H_2CO_3$. This is normally considered a mild acid, but with increased solubility the acid becomes stronger acid. The resultant pH will vary depending upon the depth of the well and the stage of the injection process. In deeper wells that have a higher hydrostatic pressure, the pH will be lower than that in shallow wells. This can result in a stronger acid that would have greater capability of chemical dissolution due to the availability of the $H^+$ ions. In addition to the pressure, the temperature of the water will be lowered during the $CO_2$ injection process. As the temperature is lowered, the solubility of $CO_2$ increases and the pH decreases. Further on into the process, then, the acid will be stronger and have a greater capability of chemically dissolving minerals impeding the flow of water from the well. Thus, when the well is allowed to remain shut, normally overnight, $H_2CO_3$ can dissolve mineral deposits.

There are three forms of phase changes which occur when $CO_2$ is injected under pressure into a sealed well. First, there is vaporization, the phase change from liquid $CO_2$ to gaseous $CO_2$ with various volumes of expansion depending upon the pressure inside the well and surrounding aquifer. Depending upon the depth of the injection point, and more importantly the hydrostatic pressure at that point, the volume of gas released per pound of $CO_2$ will vary. For example, the volume increase at atmospheric pressure is approximately 560 times, whereas at a pressure of 300 psi the volume increase is approximately 19 times.

Next is freezing, the phase change from liquid $CO_2$ to solid $CO_2$. The pressure directly below the packer 1 is regulated to a level such that liquid $CO_2$ will rapidly lo solidify upon entry into the sealed well. This pressure is regulated to be preferably between about 0 and 70 psi. The temperature of the liquid $CO_2$ is now approximately $-110°$ F. The formation of solid $CO_2$ inside a well is desirable due to the slower release of energy as the solid $CO_2$ sublimes to gaseous $CO_2$. This allows ongoing energy of agitation and energy of detachment to take place.

Finally, the sublimation of solid $CO_2$ to gaseous $CO_2$ is a beneficial phase change involved in the process disclosed in U.S. Pat. No. 5,394,942, as it allows ongoing energy of agitation, energy of dissolution, and energy of detachment to be released into the well and the surrounding aquifer. This phase change is much slower than the others and allows the release of energy into the well and the surrounding formation over a longer period of time. This longer release of energy allows ongoing scrubbing to take place, which can lead to additional detachment and removal of deposits from surfaces. This ongoing release of energy can occur when wells are shut in or closed overnight.

The phase of $CO_2$ delivered into the sealed well can be manipulated and regulated according to the method of injection. This manipulation is achieved by injecting gaseous $CO_2$ to remove some of the water from the well. Removal of the water from the well allows the liquid and gaseous $CO_2$ to penetrate the aquifer without freezing water too close to the well. If the water inside the well is frozen, it limits the ability to penetrate energy into the surrounding formation. Removal of water inside the well also allows reduction in the hydrostatic pressure and therefore could allow the formation of solid $CO_2$ even though the hydrostatic pressure prior to starting injection is greater than 75 psi. In the event that the hydrostatic pressure or the pressure inside the well during injection is greater than 75 psi, intermittent pulses of a negative pressure vacuum can create the formation of solid $CO_2$. This would allow the manipulation of phase changes inside the well and particularly the formation of the beneficial solid $CO_2$.

The bulk of the beneficial energy that $CO_2$ contains is in its liquid form. It is therefore desirable to deliver liquid $CO_2$ into the well and then allow the phase changes to occur in the subsurface and not inside the injection lines. Frozen $CO_2$ in the injection lines can cause spiking of the pressure gauges and also create a potentially dangerous situation with the concomitant trapping of liquid. The prevention of phase change from liquid $CO_2$ to solid $CO_2$ inside the injection lines can be prevented by maintaining a pressure of greater than 75 psi in the injection lines. This is easy to achieve in deep wells but is more difficult in shallow wells due to lower hydrostatic pressure. In shallow wells regulating the ratio of gaseous and liquid $CO_2$ feed can therefore increase the pressure in the injection lines.

Additionally, there is a difference in the viscosity between gaseous and liquid $CO_2$. The pulses of liquid $CO_2$ that are introduced into the well with a continuous gaseous $CO_2$ feed can be increased in frequency and length as the process continues. The feed of liquid with the gaseous $CO_2$ allows the liquid to be carried into the well and the surrounding formation more effectively. The gaseous $CO_2$ can therefore be looked at as a carrier for the liquid $CO_2$. Also, gaseous $CO_2$ is more viscous and thus does not flow as easily through injection lines as liquid $CO_2$. By increasing the ratio of gaseous $CO_2$ in the gas-liquid mix, the flow through the line is impeded and there will be more back pressure on the line. With more back pressure, it is possible to increase the pressure to a point where liquid $CO_2$ does not freeze. This will then allow that phase change to take place inside the well and the surrounding formation instead of inside the injection lines.

After the well is filled with solid $CO_2$ and the solid $CO_2$ sublimes, the remaining residual pressure within the well can be released and the packer 1 removed. The water flow in the well has now been stimulated and bacteria within the well controlled. If desired, the process can be repeated a number of times until the desired effect is achieved. Normally, one cycle is sufficient in obtaining the desired effect. In special circumstances, a number of cycles can be employed.

It should be noted that the energy delivery ability of the process disclosed in U.S. Pat. No. 5,394,942 is also effective in aiding the removal of drilling mud and other physical blocking agents during the drilling and development of a well. The removal of drilling mud, natural clay and silt, and other physical blocking agents can be the most difficult part of traditional development procedures. The energy in gaseous and liquid $CO_2$ can be effective in breaking down and dispersing these agents.

The present invention comprises an improved method for stimulating the flow of water in a dry or inefficient well. The method is not limited to any type of well and, in fact, the present method can be used to stimulate water flow in any known type of well. The process disclosed in U.S. Pat. No. 5,394,942 has proven very effective in the development of horizontally or directionally drilled wells. Thus, while the present invention has been described in connection with exemplary embodiments thereof, it will be understood that many modifications in both design and use will be apparent to those of ordinary skill in the art; and this application is intended to cover any adaptations or variations thereof. It is therefore manifestly intended that this invention be limited only by the claims and the equivalents thereof.

The invention claimed is:

1. A method of stimulating a flow of water into a well from water in strata surrounding the well, comprising the steps of gathering information about the history and physical characteristics of the well and surrounding aquifer; providing telemetry machinery to monitor internal conditions within the well; sealing the well in a manner such that pressurization of the well can be accomplished; introducing liquid and gaseous carbon dioxide ($CO_2$) into the well at a downhole pressure such that the liquid $CO_2$ solidifies within the well forming solid $CO_2$; manipulating and regulating the phase of $CO_2$ delivered into the sealed well according to information provided by the telemetry machinery; continuing introduction of the liquid and gaseous $CO_2$ into the well until a desired level of filling of the well with solid $CO_2$ is attained; allowing the sealed well containing solid $CO_2$ to stand for a time sufficient to sublime the solid $CO_2$ contained in the sealed well; releasing residual pressure in the sealed well; and releasing the seal from the well.

2. The method according to claim 1, wherein sealing of the well comprises placing a sealing means on a casing of the well or in the well and securing the sealing means thereto.

3. The method according to claim 1, further comprising purging the sealed well with gaseous $CO_2$ prior to introduction of the liquid $CO_2$.

4. The method according to claim 1, wherein the steps of the method are repeated a plurality of times in order to obtain the desired flow of water.

5. The method according to claim 1, wherein the phase of $CO_2$ is manipulated and regulated through maintaining a downhole pressure within the range of between about 0 to 70 psi.

6. The method according to claim 5, wherein the means of manipulating and regulating the phase of $CO_2$ comprises delivering intermittent pulses of a negative pressure to stimulate the formation of solid $CO_2$.

7. The method according to claim 1, further comprising removing bacterial growth within the well.

8. The method according to claim 1, further comprising removing scale contained within the well.

9. The method according to claim 7, wherein sublimation of the solid $CO_2$ within the sealed well generates pressure within the sealed well and time releases carbonic acid into strata of the well.

10. The method according to claim 1, wherein the downhole pressure is sufficient to assure freezing of the water within the formation and surrounding strata.

11. The method according to claim 1, wherein the telemetry machinery comprises a downhole temperature and pressure telemetry transducer.

* * * * *

UNITED STATES PATENT AND TRADEMARK OFFICE
CERTIFICATE OF CORRECTION

PATENT NO. : 7,270,179 B2
APPLICATION NO. : 10/512672
DATED : September 18, 2007
INVENTOR(S) : Steven Catania It is certified that error appears in the above-identified patent and that said Letters Patent is hereby corrected as shown below:

Title Page:

Item (12) Please delete; Mansuy and insert Catania

Section [75], Please delete; Neil Mansuy, Kansas City, MO and insert; Steven Catania, New Windsor, New York Signed and Sealed this Twenty-fourth Day of June, 2008

JON W. DUDAS
*Director of the United States Patent and Trademark Office*